US012776800B2

(12) United States Patent
Qin et al.

(10) Patent No.: US 12,776,800 B2
(45) Date of Patent: Oct. 27, 2026

(54) PROTECTIVE CASE CAPABLE OF BEING FLIPPED TO ACHIEVE SUPPORTING AND CAPABLE OF ADJUSTING FLIPPING AND ROTATING ANGLES

(71) Applicant: Foshan Lulne Technology Co., Ltd., Foshan (CN)

(72) Inventors: Jianming Qin, Guiping (CN); Jiaming Liang, Huazhou (CN)

(73) Assignee: Foshan Lulne Technology Co., Ltd., Foshan (CN)

( * ) Notice: Subject to any disclaimer, the term of this patent is extended or adjusted under 35 U.S.C. 154(b) by 423 days.

(21) Appl. No.: 18/507,059

(22) Filed: Nov. 12, 2023

(65) Prior Publication Data

US 2024/0080058 A1 Mar. 7, 2024

(30) Foreign Application Priority Data

Oct. 23, 2023 (CN) ......................... 202322838425.7

(51) Int. Cl.
*H04B 1/3888* (2015.01)
*H04M 1/04* (2006.01)

(52) U.S. Cl.
CPC ............ *H04B 1/3888* (2013.01); *H04M 1/04* (2013.01)

(58) Field of Classification Search
CPC ..... H04B 1/3888; H04B 1/3877; H04M 1/04; H04M 1/185; H04M 1/0216; H04M 1/0237; H04M 1/022; H04M 1/72409; A45C 11/002; A45C 2200/15; A45C 11/003; A45C 13/002; A45C 13/005; A45C 13/34
See application file for complete search history.

(56) References Cited

U.S. PATENT DOCUMENTS

| | | | | |
|---|---|---|---|---|
| 2015/0382488 A1 | 12/2015 | Lin et al. | | |
| 2018/0019779 A1 | 1/2018 | Chou | | |
| 2019/0247007 A1 | 8/2019 | Tsai et al. | | |
| 2023/0223976 A1 * | 7/2023 | Weng | H04B 1/3877 | 455/575.8 |
| 2023/0299807 A1 * | 9/2023 | Yang | H04B 1/3888 | 455/575.8 |

FOREIGN PATENT DOCUMENTS

| | | | |
|---|---|---|---|
| EP | 3813346 A1 * | 4/2021 | A45C 11/002 |

* cited by examiner

*Primary Examiner* — Jing Gao
(74) *Attorney, Agent, or Firm* — Hemisphere Law, PLLC

(57) ABSTRACT

A protective case capable of being flipped to achieve supporting and capable of adjusting flipping and rotating angles, includes a back plate, and a supporting component and a rotating mechanism which are mounted on the back plate. According to the present disclosure, in the horizontal rotating mechanism, horizontal rotation is achieved by mutual cooperation between only one annular rotating member and the rotating slot of the back plate, so that the protective case is simple in structure, easy to mount, and low in later maintenance rate; and furthermore, through the arrangement of a supporting positioning component, tangent planes that form angles are arranged on two shaft sleeves and the rotating shaft, so that the flippable supporting member can achieve mutually pressed rotation during flipping, and the flippable supporting member can be flipped and positioned in an angle.

10 Claims, 13 Drawing Sheets

PROTECTIVE CASE CAPABLE OF BEING FLIPPED TO ACHIEVE SUPPORTING AND CAPABLE OF ADJUSTING FLIPPING AND ROTATING ANGLES

TECHNICAL FIELD

The present disclosure relates to the technical field of protective cases of electronic products with flipping and rotating mechanisms, and in particular, to a protective case capable of being flipped to achieve supporting and capable of adjusting flipping and rotating angles.

BACKGROUND

Existing protective cases capable of being flipped to achieve supporting and rotatably adjusting an angle include a rotating mechanism that is complex in structural design. The rotating mechanism often uses a longitudinal axis as a rotating axis for horizontal rotation. This structure has disadvantages as follows: The first disadvantage is that a slot cannot completely penetrate through a back plate during slotting, and the second disadvantage is that there are many structural components, so that the disassembling difficulty is high, and the later maintenance and failure rate is also high. In addition, most of these existing protective cases cannot be arbitrarily angled during flipping of a flippable supporting member, and cannot achieve damped fixed-angle rotation during horizontal rotation of the flippable supporting member after the flippable supporting member is flipped, which brings a bad use experience to customers.

SUMMARY

In order to overcome the shortcomings in the prior art, the present disclosure aims to provide a protective case capable of being flipped to achieve supporting and capable of adjusting flipping and rotating angles, so as to solve the technical problem mentioned in the background section.

In order to solve the technical problem, the present disclosure is implemented using the following technical solutions:

A protective case capable of being flipped to achieve supporting and capable of adjusting flipping and rotating angles includes a back plate, and a supporting component and a rotating mechanism which are mounted on the back plate, wherein the supporting component includes a flippable supporting member, a supporting connecting member, and a rotating shaft; the flippable supporting member is fixedly connected to the supporting connecting member; the supporting connecting member is rotatably connected to the rotating mechanism through the rotating shaft; the rotating mechanism includes a fixing component and a rotating member; a mounting slot is arranged on one side of the back plate; a rotating slot is arranged at a position, corresponding to the rotating member, on the mounting slot; and the rotating member is limited and fixed by a fixing component and performs a horizontal rotating action relative to the back plate.

Specifically, the fixing component includes a fixed seat and a fixing sheet; the fixed seat is located at an upper end of the fixing sheet and is fixed with the fixing sheet; and the rotating member is limited between the fixed seat and the fixing sheet.

Specifically, the supporting component further includes a rotating connecting member; and one end of the rotating connecting member is fixedly connected to the fixed seat, and the other end is rotatably hinged with the supporting connecting member, so that the flippable supporting member can perform a flipping action relative to the rotating mechanism and can perform the horizontal rotating action with the linkage of the rotating mechanism after being flipped, to change a supporting angle of the flippable supporting member relative to the back plate.

Specifically, the protective case further includes a supporting positioning component, wherein the positioning supporting component includes a first shaft sleeve, a second shaft sleeve, and a rotating shaft; the first shaft sleeve is located on one side of the supporting connecting member; the second shaft sleeve is located on one side of the rotating connecting member; one end of the rotating shaft is in through-rotatable fit with the first shaft sleeve, and the other end is in through-rotatable fit with the second shaft sleeve; a first tangent plane is arranged on the rotating shaft; and second tangent planes are arranged on both the first shaft sleeve and the second shaft sleeve, so that when the flippable supporting member rotates, the rotating shaft and the first shaft sleeve, as well as the second shaft sleeve, perform mutually pressed rotation to achieve positioning and supporting at any angle.

Specifically, the first tangent plane and the second tangent planes form angles after the first shaft sleeve, the second shaft sleeve, and the rotating shaft are assembled.

Specifically, the protective case further includes a rotating positioning component, wherein the rotating positioning component includes a positioning bulge and a positioning recess; several positioning bulges are arranged on an outer side of the rotating member, and several positioning recesses are arranged at positions, corresponding to the positioning bulges, on an inner side of the rotating slot; and when the rotating mechanism rotates, the rotating mechanism is positioned at a certain fixed angle by relying on snap-in fit between the positioning bulges and the positioning recesses.

Specifically, the protective case further includes a damped limiting mechanism, wherein an elastic member is arranged on one side of the fixed seat; and an output end of the elastic member just abuts against the rotating member, so as to provide an elastic support for the rotating member during rotation of the rotating member to form rotating damping to the rotating member.

Specifically, the elastic member includes a spring and a U-shaped clip; one side of the fixed seat is sunken to form a spring cavity; one side of the spring cavity facing to the rotating member is opened; the spring is mounted in the spring cavity; the U-shaped clip is arranged on an outer side of the spring; and a U-shaped bottom end of the U-shaped clip abuts against the rotating member.

Specifically, the fixing sheet is provided with a first riveting hole; a first riveting column is arranged at a position, corresponding to the first riveting hole, on the fixed seat; the fixing sheet and the fixed seat are fixed through riveting alignment between the first riveting hole and the first riveting column; the supporting connecting member is provided with a second riveting hole; a second riveting column is arranged at a position, corresponding to the second riveting hole, on the flippable supporting member; the rotating connecting member is provided with a third riveting hole; and a third riveting column is arranged at a position, corresponding to the third riveting hole, on the fixed seat.

Specifically, a shaft turntable is arranged at a lower end of the fixed seat; a diameter of the shaft turntable is precisely matched with an inner ring of the rotating member axially; and an anti-falling edge is also arranged at an upper end of the rotating slot.

Compared with the prior art, the present disclosure has the beneficial effects below:

(1) According to the present disclosure, in the horizontal rotating mechanism, horizontal rotation is achieved by mutual cooperation between only one annular rotating member and the rotating slot of the back plate, so that the protective case is simple in structure, easy to mount, and low in later maintenance rate; and furthermore, through the arrangement of the supporting positioning component, the tangent planes that form angles are arranged on the two shaft sleeves and the rotating shaft, so that the flippable supporting member can achieve mutually pressed rotation during flipping, and the flippable supporting member can be flipped and positioned in an angle.

(2) According to the present disclosure, the rotating positioning component is arranged between the rotating member and the fixing component; the positioning bulges are arranged on the rotating member; and the positioning recesses are arranged on the rotating slot. Therefore, when rotating, the rotating member can achieve horizontal rotation by the mutual snap-in fit between the positioning recesses and the positioning bulges and can also fix an angle.

(3) In terms of the assembling and horizontal rotation of the rotating member, the shaft turntable is arranged below the fixed seat, and the rotating member is clamped between the fixed seat and the fixing sheet through the fixed seat and the fixing sheet. Through the arrangement of the anti-falling edge, the whole rotating member is limited in the mounting slot of the back plate. Through the arrangement of the damped limiting mechanism, the spring and the U-shaped clip are used to directly resist against the rotating member, so that the rotating member can be damped when rotating relative to the rotating slot, and it is more convenient to fix an angle during the horizontal rotation.

Figure 1:
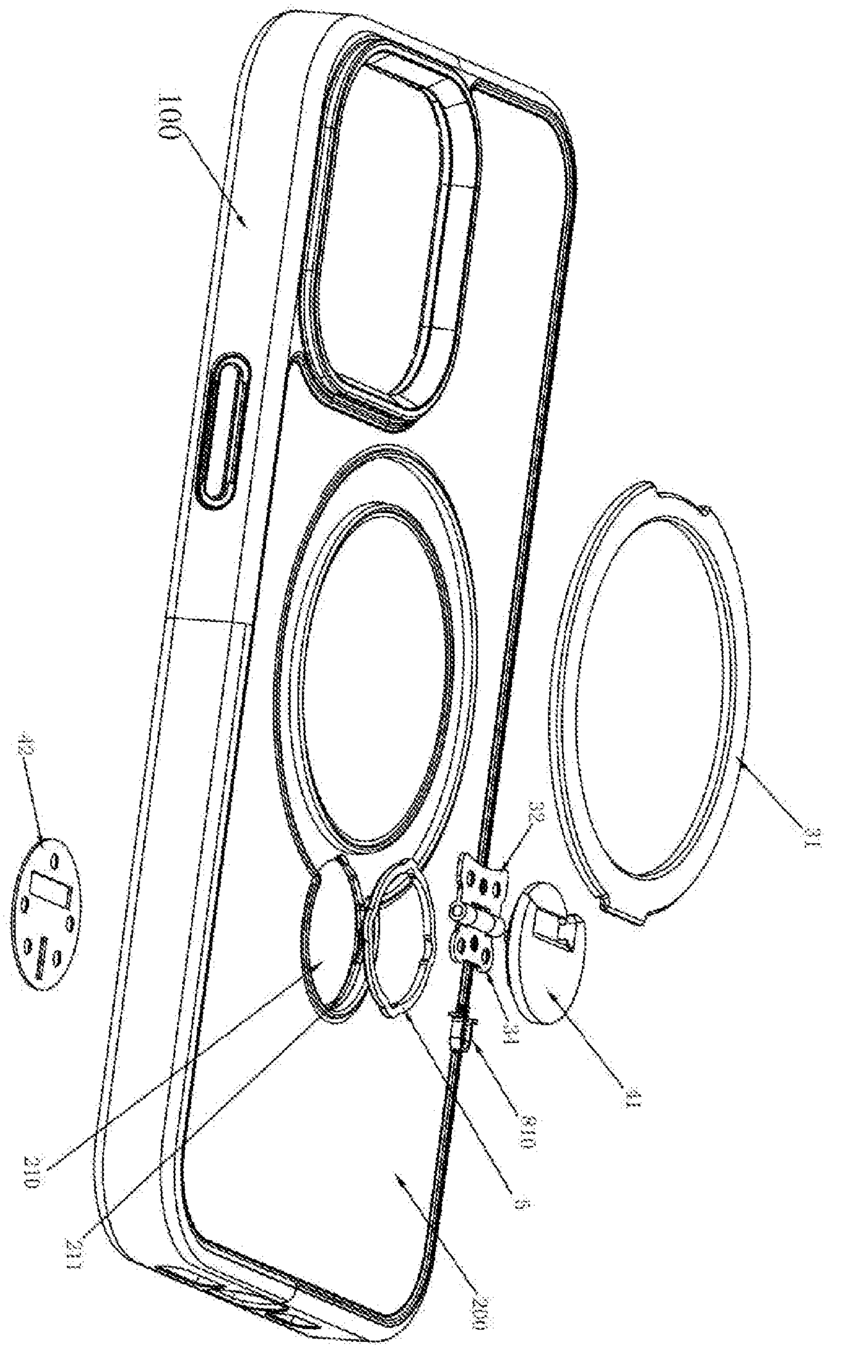
FIG. 1 is an exploded diagram I of an overall structure of a protective case of the patent of the present disclosure.
Figure 2:
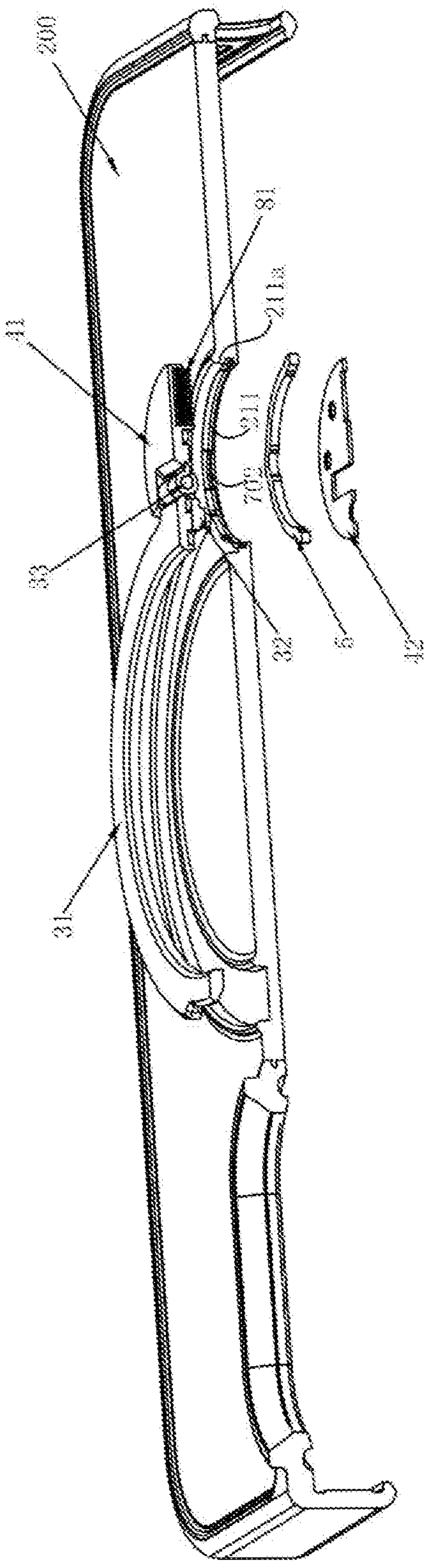
FIG. 2 is a sectional view of an entire structure of a protective case of the patent of the present disclosure.

In the drawings: case body 100, back plate 200, supporting component 300, rotating mechanism 400, flippable supporting member 31, supporting connecting member 32, rotating shaft 33, rotating member 5, mounting slot 210, rotating slot 211, fixing component 4, fixed seat 41, fixing sheet 42, rotating connecting member 34, first shaft sleeve 61, second shaft sleeve 62, first tangent plane 601, second tangent plane 602, positioning bulge 701, positioning recess 702, elastic member 81, spring 811, U-shaped clip 812, spring cavity 411, first riveting hole 421, first riveting column 412, second riveting hole 321, second riveting column 311, third riveting hole 341, third riveting column 413, shaft turntable 414, and anti-falling edge 211*a*.

DETAILED DESCRIPTION OF THE EMBODIMENTS

The present disclosure is further described below in combination with accompanying drawings and specific implementations. It should be noted that all embodiments or all technical features described below can be combined arbitrarily to form new embodiments.

Referring to FIG. 1 to FIG. 13:

Referring to FIG. 1 to FIG. 5, Embodiment 1: The present disclosure discloses a protective case capable of being flipped to achieve supporting and capable of adjusting flipping and rotating angles. The protective case includes a case body 100 and a back plate 200. The case body 100 is sunken to form a slot position configured to place an electronic product, such as a mobile phone or a tablet. A supporting component 300 and a rotating mechanism 400 are mounted on the back plate 200. The supporting component 300 includes a flippable supporting member 31, a supporting connecting member 32, and a rotating shaft 33. The flippable supporting member 31 is fixedly connected to the supporting connecting member 32, and the supporting connecting member 32 is rotatably connected to the rotating mechanism 400 through the rotating shaft 33. Preferably, an embedding slot for embedding the flippable supporting member 31 is also arranged on the back plate 200. A shape of the embedding slot is the same as that of the flippable supporting member 31, so that the flippable supporting member 31 can be leveled with an end surface of the back plate 200 after being reset to ensure the beautiful appearance. Specifically, the rotating mechanism 400 includes a fixing component 4 and a rotating member 5. A mounting slot 210 is arranged on one side of the back plate 200; and a rotating slot 211 is arranged at a position, corresponding to the rotating member 5, on a slot surface of an inner side of the mounting slot 210. The fixing component 4 can limit and fix the rotating member 5, and the rotating member 5 can perform a horizontal rotation action relative to the back plate 200, that is, the rotating member 5 and the fixing component 4 are fixedly connected, and the fixing component 4 is also arranged in the mounting slot 210. Due to longitudinal limitations of the rotating member 5 and the rotating slot 211, the entire rotating mechanism 400 will not be separated, and the entire rotating mechanism 400 can rotate around the rotating slot 211 by taking the rotating member 5 as the rotating shaft 33, achieving horizontal rotation. The rotating mechanism 400 is only composed of the fixing component 4 and the rotating member 5, eliminating the longitudinal rotating shaft 33 and a complex rotating fixing structure, so that it is easier to mount the rotating mechanism. In the later stage, this kind of structure has a lower repair rate.

Specifically, the fixing component 4 is also mounted in the mounting slot 210. The fixing component 4 includes a fixed seat 41 and a fixing sheet 42. The fixed seat 41 is located at an upper end of the fixing sheet 42 and can be fixed with the fixing sheet 42. Preferably, the fixed seat 41 and the fixing sheet 42 are fixedly connected in a riveting manner. When the fixed seat 41 and the fixing sheet 42 are riveted and fixed, the rotating member 5 is precisely clamped in between the fixed seat and the fixing sheet, thereby limiting the rotating member 5. Moreover, since the rotating member 5 is of a flat structure and rotates in a limited manner with the rotating slot 211, the rotating member can also be communicated to the fixing component 4 for limitation, which prevents longitudinal separation of the entire rotating mechanism 400.

Specifically, the supporting component 300 further includes a rotating connecting member 34; and one end of the rotating connecting member 34 is fixedly connected to the fixed seat 41, and the other end is rotatably hinged with the supporting connecting member 32, so that the flippable supporting member 31 can perform a flipping action relative to the rotating mechanism 400 and can perform the horizontal rotating action with the linkage of the rotating mechanism 400 after being flipped, to change a supporting angle of the flippable supporting member 31 relative to the back plate 200.

Figure 6:
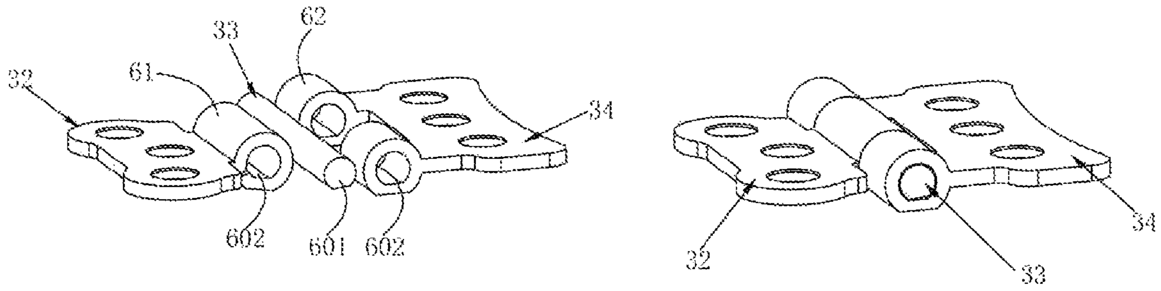
FIG. 6 is a schematic structural diagram I of a supporting connecting member and a rotating connecting member in a protective case of the patent of the present disclosure.
Figure 7:
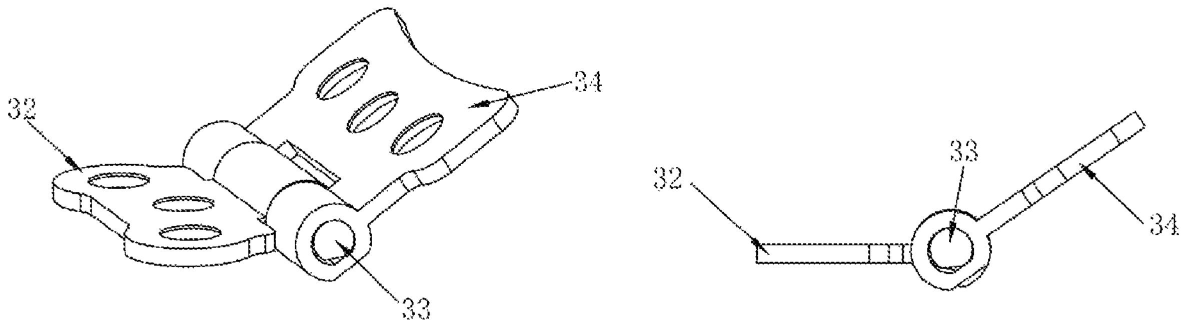
FIG. 7 is a schematic structural diagram II of a supporting connecting member and a rotating connecting member in a protective case of the patent of the present disclosure.
Figure 8:
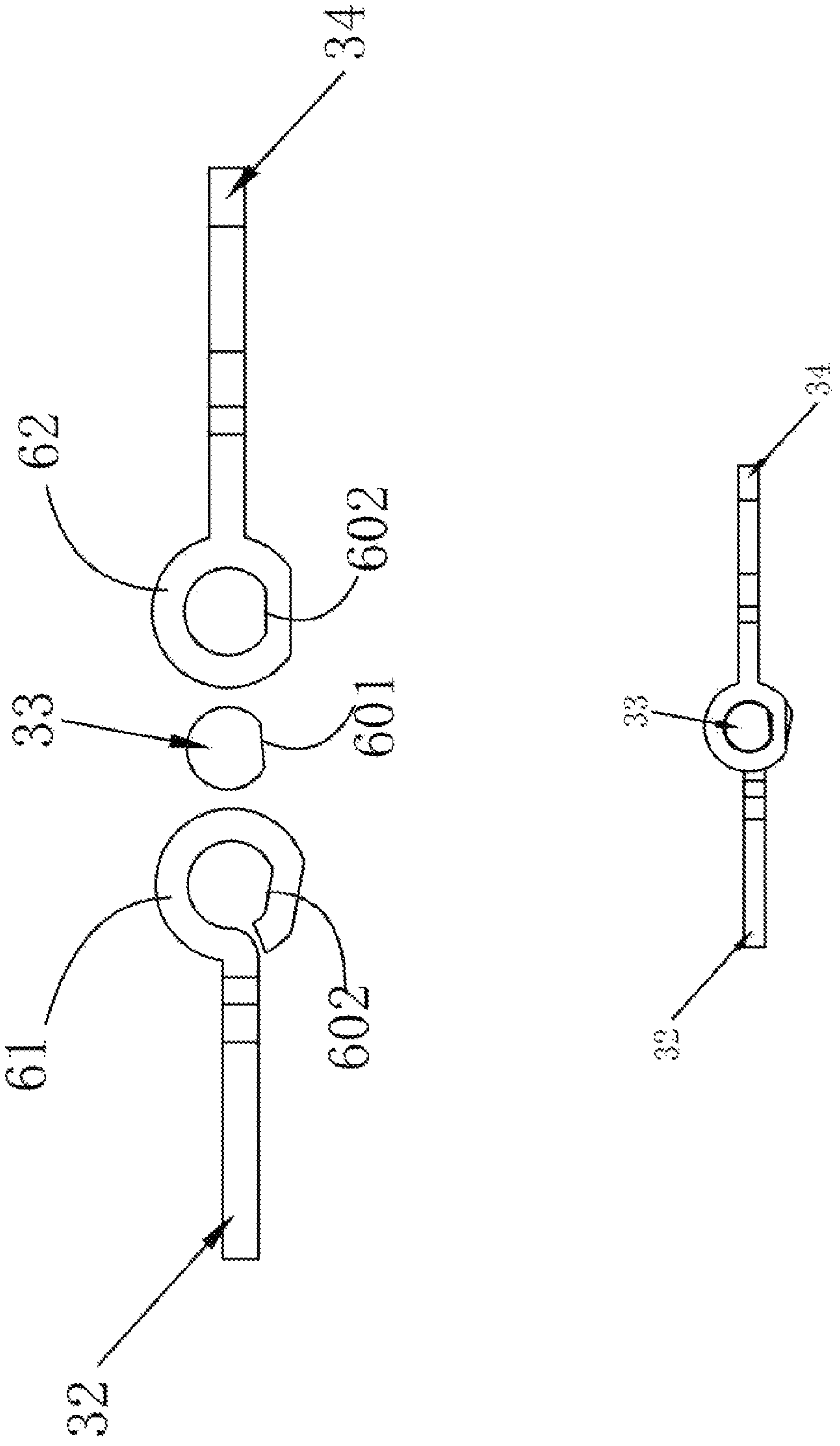
FIG. 8 is a schematic structural diagram III of a supporting connecting member and a rotating connecting member in a protective case of the patent of the present disclosure.
Figure 9:
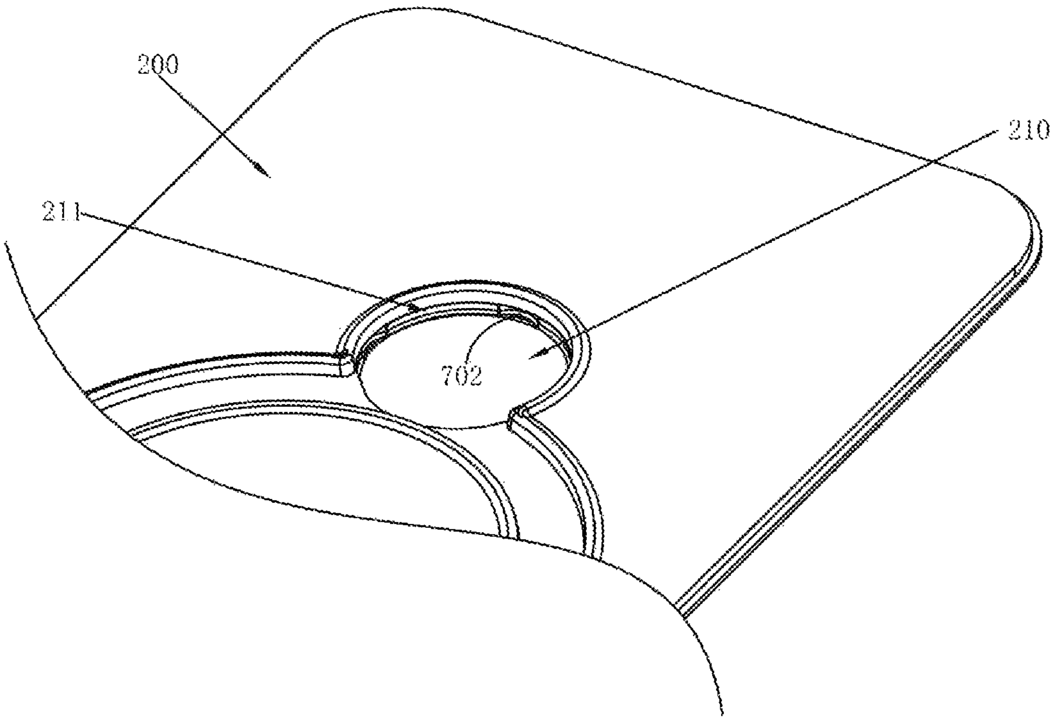
FIG. 9 is a schematic structural diagram of a back plate in a protective case of the patent of the present disclosure.
Figure 10:
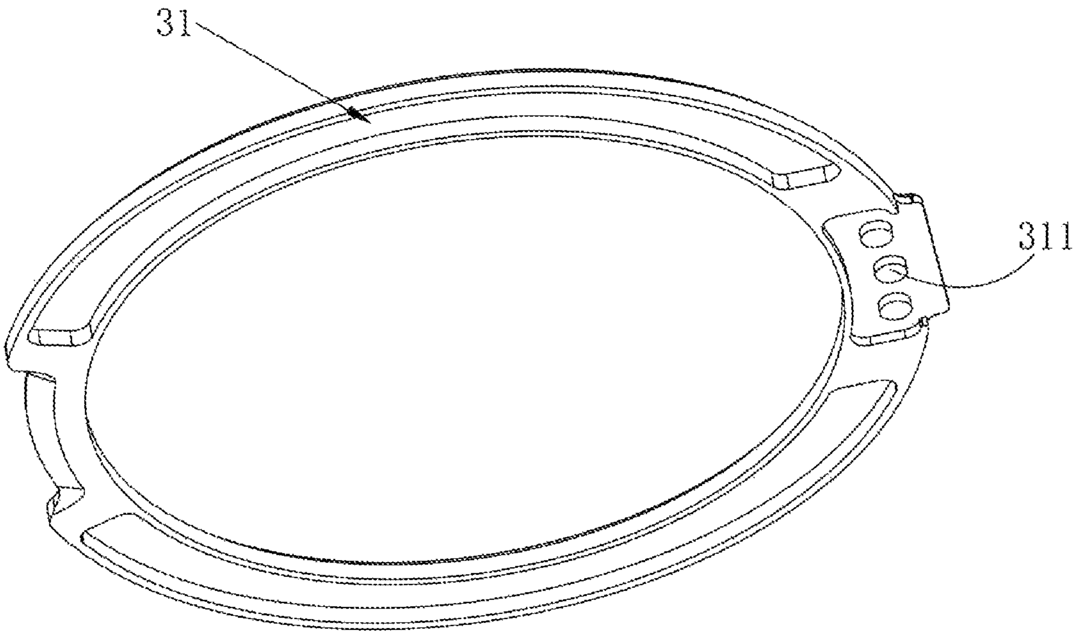
FIG. 10 is a schematic structural diagram of a flippable supporting member in a protective case of the patent of the present disclosure.
Figure 11:
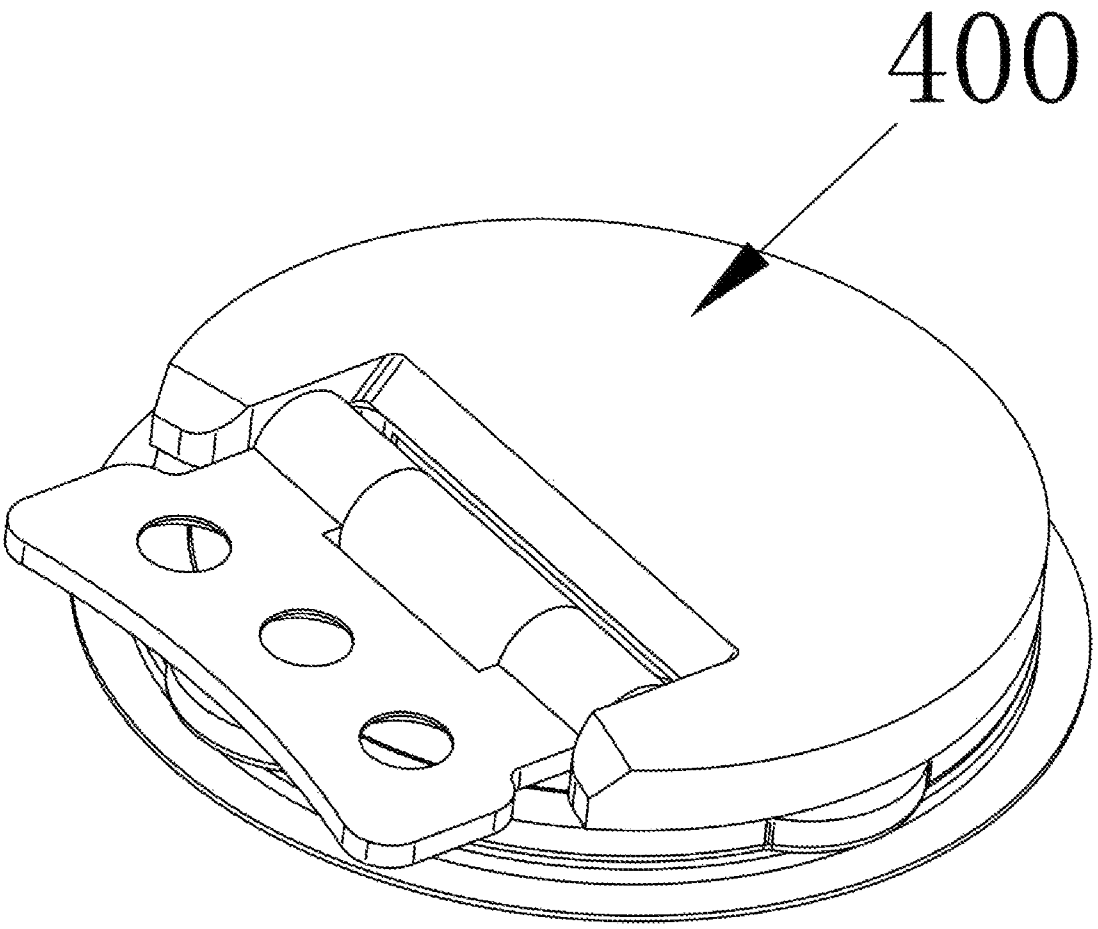
FIG. 11 is an assembling diagram of a rotating mechanism in a protective case of the patent of the present disclosure.
Figure 12:
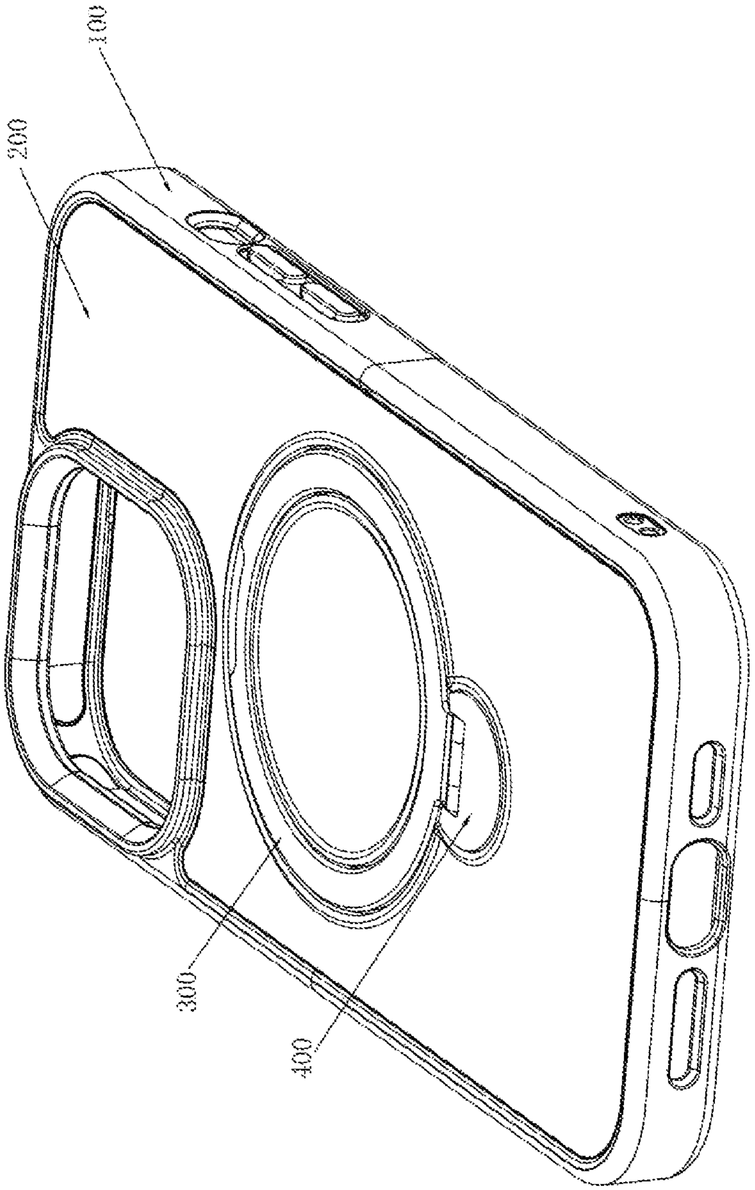
FIG. 12 is an exploded diagram II of an overall structure of a protective case of the patent of the present disclosure.
Figure 13:
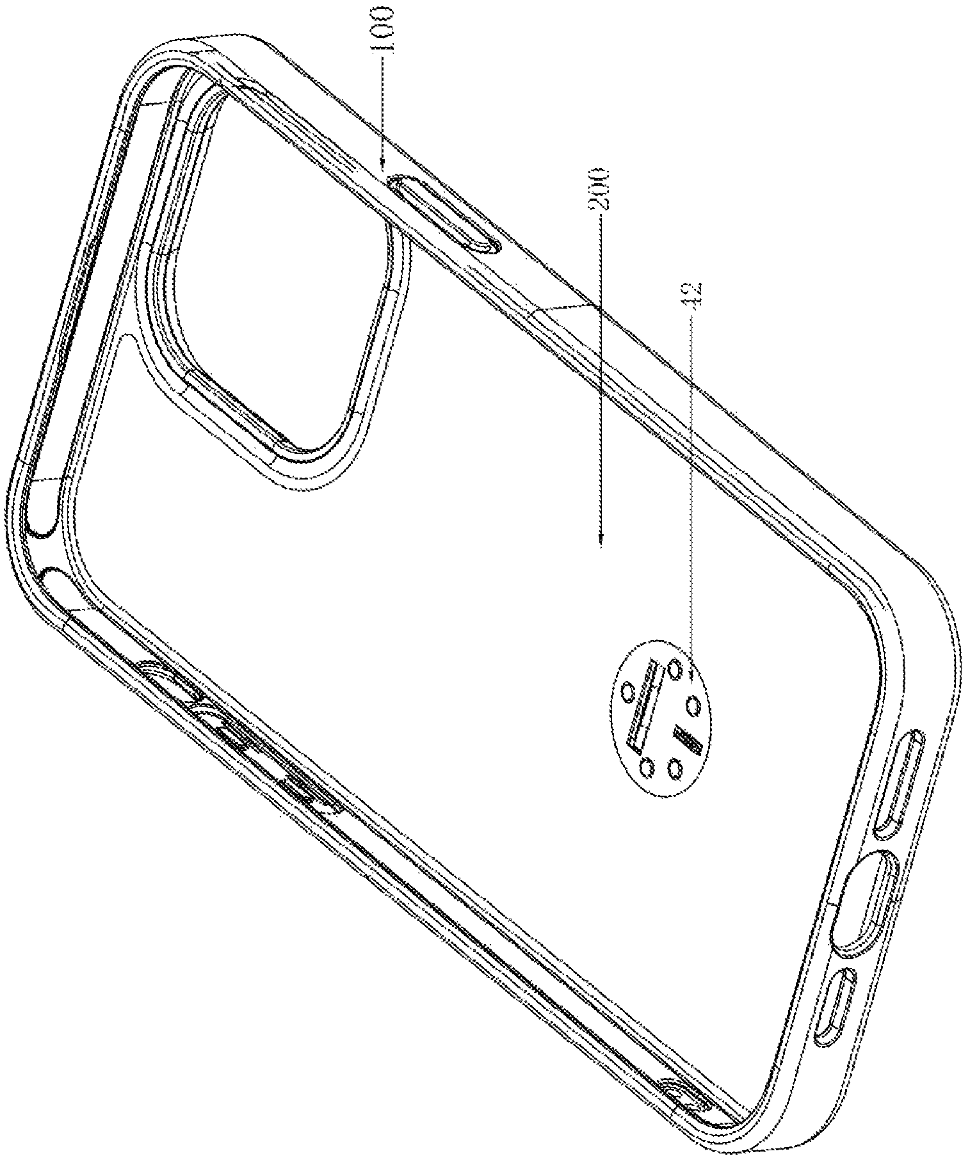
FIG. 13 is an exploded diagram III of an overall structure of a protective case of the patent of the present disclosure.

Referring to FIG. 6 to FIG. 8, Embodiment 2: Based on Embodiment 1, this embodiment provides an embodiment in which a flippable supporting member 31 can be flipped at a fixed angle. Specifically, the protective case further includes a supporting positioning component. The positioning supporting component 300 includes a first shaft sleeve 61, a second shaft sleeve 62, and a rotating shaft 33; the first shaft sleeve 61 is located on one side of the supporting connecting member 32; the second shaft sleeve 62 is located on one side of the rotating connecting member 34; one end of the rotating shaft 33 is in through-rotatable fit with the first shaft sleeve 61, and the other end is in through-rotatable fit with the second shaft sleeve 62; a first tangent plane 601 is arranged on the rotating shaft 33; and second tangent planes 602 are arranged on both the first shaft sleeve 61 and the second shaft sleeve 62. In order to achieve mutually pressed rotation between the rotating shaft 33 and the first shaft sleeve 61, as well as the second shaft sleeve 62, during the rotation of the flippable supporting member 31, so that supporting can be positioned at any angle. It should be understood that the rotation between the two shaft sleeves and the rotating shaft 33 is not an unobstructed rotation fit between the circular rotating shaft 33 and the circular shaft sleeves, but diagonal pressing occurring during the rotation of the shaft sleeves around the rotating shaft 33 due to the tangent planes, namely, waist-shaped tangent planes, of the two shaft sleeves. Thus, the flippable supporting member 31 can be fixed when opened.

Specifically, the first tangent plane 601 and the second tangent planes 602 form angles after the first shaft sleeve 61, the second shaft sleeve 62, and the rotating shaft 33 are assembled. Preferably, the angles are acute angles, that is, angles less than 90 degrees.

Referring to FIG. 2 to FIG. 4 and FIG. 9, Embodiment 3: Based on Embodiment 1 and Embodiment 2, this embodiment provides an embodiment that can fix an angle when the rotating mechanism 400 performs the horizontal rotation, which solves the problem that an angle cannot be fixed when this kind of rotating mechanism 400 in the traditional art performs the horizontal rotation. Specifically, the protective case further includes a rotating positioning component. The rotating positioning component includes a positioning bulge 701 and a positioning recess 702; several positioning bulges 701 are arranged on an outer side of the rotating member 5, and several positioning recesses 702 are arranged at positions, corresponding to the positioning bulges 701, on an inner side of the rotating slot 211; and when the rotating mechanism 400 rotates, the rotating mechanism 400 is positioned at a certain fixed angle by relying on snap-in fit between the positioning bulges 701 and the positioning recesses 702. The positioning bulges 701 described above are arranged on an outer side of the rotating member 5. Preferably, the positioning bulges can be arranged at four positions: 0 degree, 90 degrees, 180 degrees, and 270 degrees. In this way, the flippable supporting member 31 can rotate 90 degrees as the rotating mechanism 400 is hardly rotated at one shift, and a placement angle of the protective case can be adjusted by rotating the rotating mechanism 400 at totally four shifts. The positions of the positioning recesses 702 on the corresponding rotating slot 211 are also in the same way. Of course, as other optional embodiments, a quantity of the positioning bulges 701 and a quantity of the positioning recesses 702 can be greater than 4, such as 6 or 8. This achieves positioning adjustment in more angles.

Figure 3:
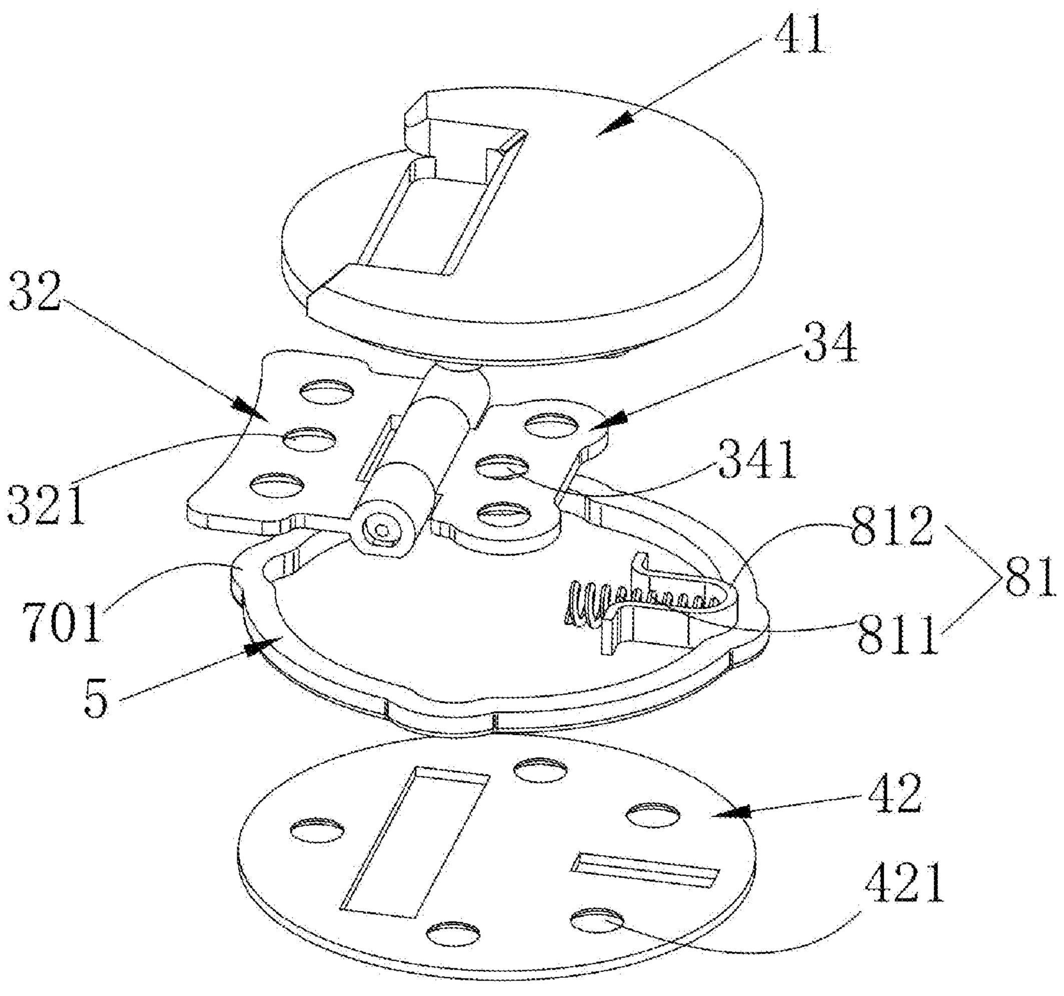
FIG. 3 is an exploded diagram I of a supporting component and a rotating mechanism in a protective case of the patent of the present disclosure.
Figure 4:
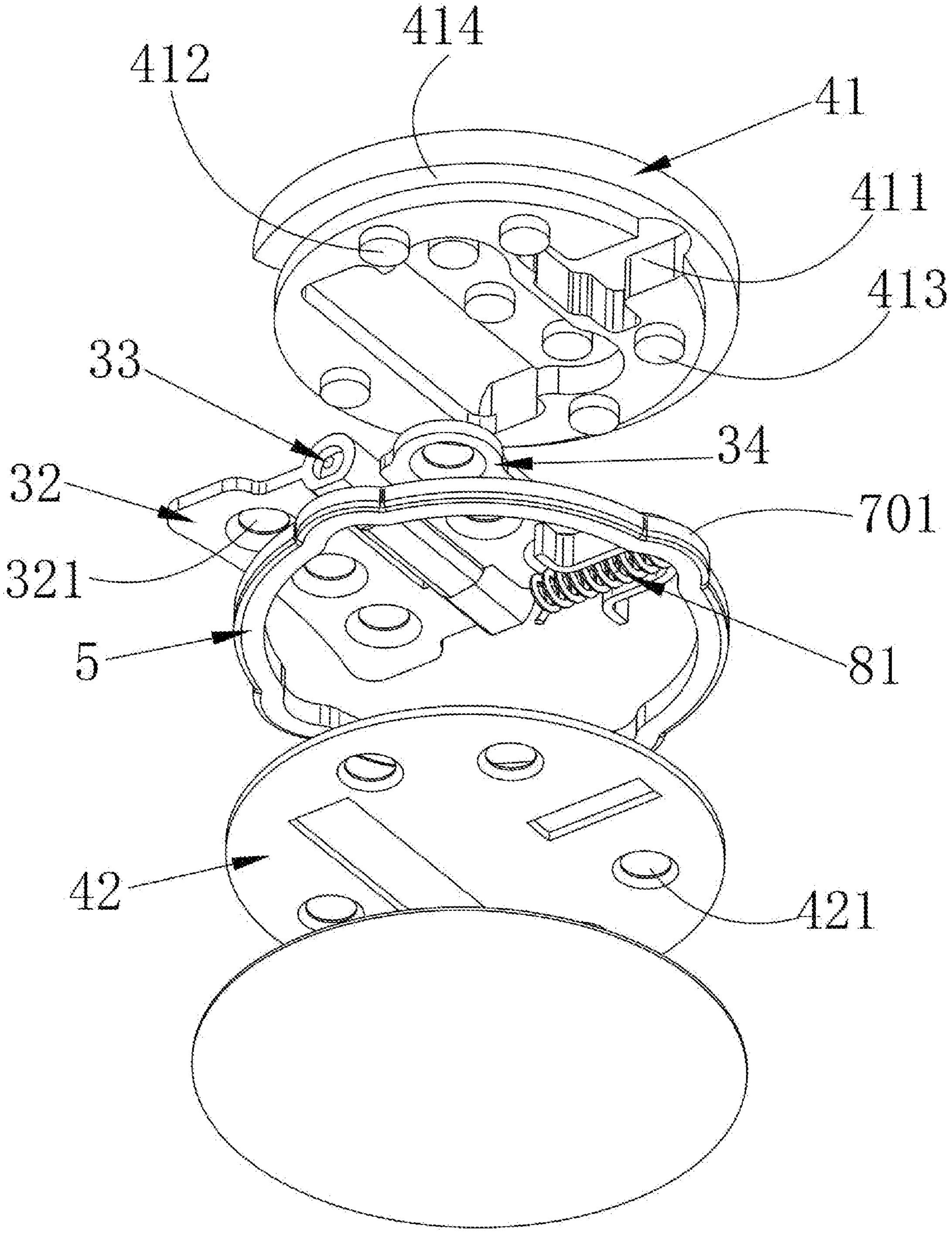
FIG. 4 is an exploded diagram II of a supporting component and a rotating mechanism in a protective case of the patent of the present disclosure.
Figure 5:
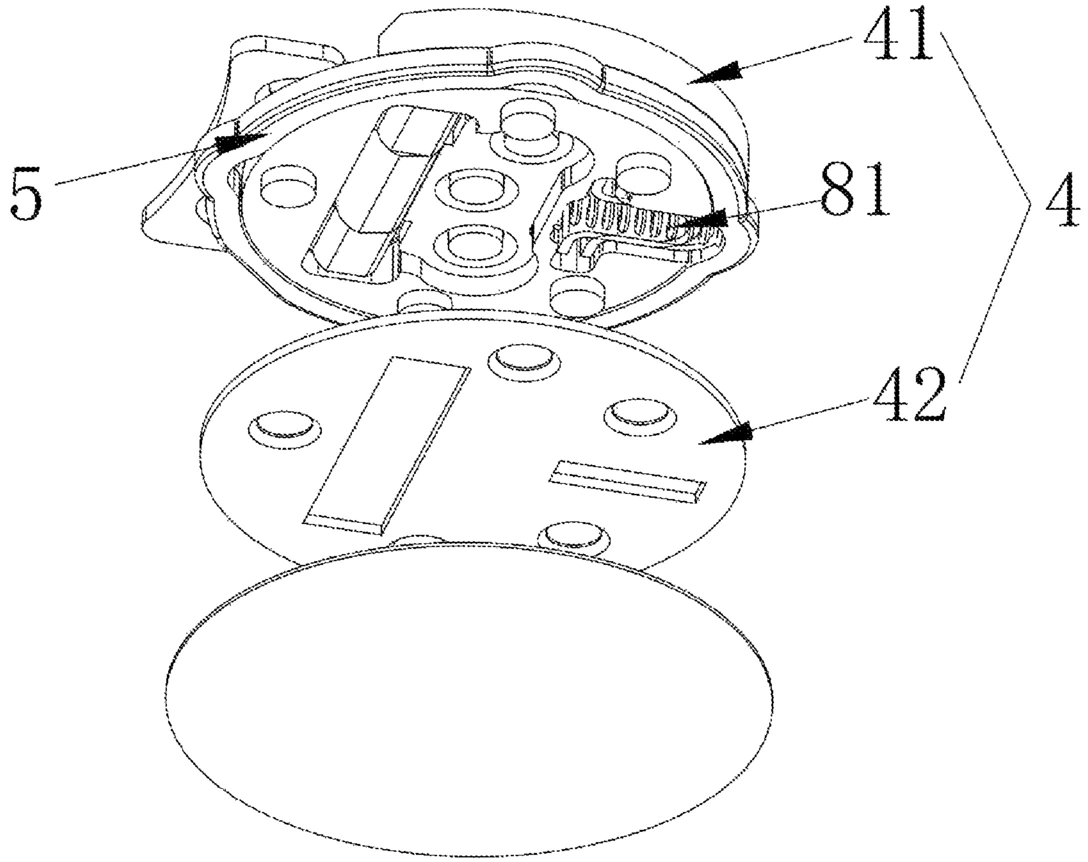
FIG. 5 is an exploded diagram III of a supporting component and a rotating mechanism in a protective case of the patent of the present disclosure.

Referring to FIG. 3 to FIG. 5, Embodiment 4: as a further optional embodiment, this embodiment further provides an embodiment in which the rotating member 5 performs damped rotation. Specifically, the protective case further includes a damped limiting mechanism. An elastic member 81 is arranged on one side of the fixed seat 41; and an output end of the elastic member 81 just abuts against the rotating member 5, so as to provide an elastic support for the rotating member 5 during rotation of the rotating member 5 to form rotating damping to the rotating member 5. Specifically, the elastic member 81 includes a spring 811 and a U-shaped clip 812; one side of the fixed seat 41 is sunken to form a spring cavity 411; one side of the spring cavity 411 facing to the rotating member 5 is opened; the spring 811 is mounted in the spring cavity 411; the U-shaped clip 812 is arranged on an outer side of the spring 811 and wraps the spring 811; and a U-shaped bottom end of the U-shaped clip 812 abuts against the rotating member 5. In this way, the rotating member 5 is pressed by two elastic forces, and a force bearing point always presses the position of the rotating slot 211 to increase the damping of the rotation, which can also achieve random angle fixing even if there is no positioning bulge 701 and positioning recess 702.

Specifically, in terms of specific assembling, the fixing sheet 42 is provided with a first riveting hole 421; a first riveting column 412 is arranged at a position, corresponding to the first riveting hole 421, on the fixed seat 41; the fixing sheet 42 and the fixed seat 41 are fixed through riveting alignment between the first riveting hole 421 and the first riveting column 412; the supporting connecting member 32 is provided with a second riveting hole 321; a second riveting column 311 is arranged at a position, corresponding to the second riveting hole 321, on the flippable supporting member 31; the rotating connecting member 34 is provided with a third riveting hole 341; and a third riveting column 413 is arranged at a position, corresponding to the third riveting hole 341, on the fixed seat 41. The components for riveting described above can be metal parts or made of a hard plastic material.

Specifically, a shaft turntable 414 is arranged at a lower end of the fixed seat 41; a diameter of the shaft turntable is precisely matched with an inner ring of the rotating member 5 axially; and an anti-falling edge 211*a* is also arranged at an upper end of the rotating slot 211. In this way, the shaft turntable 414 serves as an internal rotating shaft 33 for the rotating member 5, while the anti-falling edge 211*a* further limits the entire rotating mechanism 400, so that the rotating mechanism 400 will not be separated upwards.

The rotating member 5 preferably uses an annular snap ring, which is flat. A preferred mounting manner is to put the annular snap ring for injection molding during injection molding of the PC back plate 200. In this way, there is no need to press the rotating member during later mounting, so as to avoid damage to the rotating slot 211 and the back plate 200.

The above implementations are only preferred implementations of the present disclosure and cannot be used to limit the scope of protection of the present disclosure. Any non-substantive changes and replacements made by a person skilled in the art on the basis of the present disclosure all fall within the scope of protection claimed by the present disclosure.

What is claimed is:

1. A protective case capable of being flipped to achieve supporting and capable of adjusting flipping and rotating angles, comprising a back plate, and a supporting component and a rotating mechanism which are mounted on the back plate, wherein the supporting component comprises a flippable supporting member, a supporting connecting member, and a rotating shaft; the flippable supporting member is fixedly connected to the supporting connecting member; the supporting connecting member is rotatably connected to the rotating mechanism through the rotating shaft; the rotating mechanism comprises a fixing component and a rotating member; a mounting slot is arranged on one side of the back plate and is configured to receive the fixing component and the rotating member; a rotating slot is arranged at a position, corresponding to the rotating member, on the mounting slot; and the rotating member is limited in the rotating slot by the fixing component and is configured to rotate in the rotating slot so as to perform a horizontal rotating action relative to the back plate together with the fixing component and the supporting component.

2. The protective case according to claim 1, wherein the fixing component comprises a fixed seat and a fixing sheet; the fixed seat is located at an upper end of the fixing sheet and is fixed with the fixing sheet; and the rotating member is limited between the fixed seat and the fixing sheet.

3. The protective case according to claim 2, wherein the supporting component further comprises a rotating connecting member; and one end of the rotating connecting member is fixedly connected to the fixed seat, and the other end is rotatably hinged with the supporting connecting member, so that the flippable supporting member performs a flipping action relative to the rotating mechanism and performs the horizontal rotating action with a linkage of the rotating mechanism after being flipped, to change a supporting angle of the flippable supporting member relative to the back plate.

4. The protective case according to claim 3, further comprising a supporting positioning component, wherein the positioning supporting component comprises a first shaft sleeve, a second shaft sleeve, and a rotating shaft; the first shaft sleeve is located on one side of the supporting connecting member; the second shaft sleeve is located on one side of the rotating connecting member; one end of the rotating shaft is in through-rotatable fit with the first shaft sleeve, and the other end is in through-rotatable fit with the second shaft sleeve; a first tangent plane is arranged on the rotating shaft; and second tangent planes are arranged on both the first shaft sleeve and the second shaft sleeve, so that when the flippable supporting member rotates, the rotating shaft and the first shaft sleeve, as well as the second shaft sleeve, perform mutually pressed rotation to achieve positioning and supporting at any angle.

5. The protective case according to claim 4, wherein the first tangent plane and the second tangent planes form angles after the first shaft sleeve, the second shaft sleeve, and the rotating shaft are assembled.

6. The protective case according to claim 3, further comprising a rotating positioning component, wherein the rotating positioning component comprises a positioning bulge and a positioning recess; several positioning bulges are arranged on an outer side of the rotating member, and several positioning recesses are arranged at positions, corresponding to the positioning bulges, on an inner side of the rotating slot; and when the rotating mechanism rotates, the rotating mechanism is positioned at a certain fixed angle by relying on snap-in fit between the positioning bulges and the positioning recesses.

7. The protective case according to claim 3, further comprising a damped limiting mechanism, wherein an elastic member is arranged on one side of the fixed seat; and an output end of the elastic member just abuts against the rotating member, so as to provide an elastic support for the rotating member during rotation of the rotating member to form rotating damping to the rotating member.

8. The protective case according to claim 7, wherein the elastic member comprises a spring and a U-shaped clip; one side of the fixed seat is sunken to form a spring cavity; one side of the spring cavity facing to the rotating member is opened; the spring is mounted in the spring cavity; the U-shaped clip is arranged on an outer side of the spring; and a U-shaped bottom end of the U-shaped clip abuts against the rotating member.

9. The protective case according to claim 3, wherein the fixing sheet is provided with a first riveting hole; a first riveting column is arranged at a position, corresponding to the first riveting hole, on the fixed seat; the fixing sheet and the fixed seat are fixed through riveting alignment between the first riveting hole and the first riveting column; the supporting connecting member is provided with a second riveting hole; a second riveting column is arranged at a position, corresponding to the second riveting hole, on the flippable supporting member; the rotating connecting member is provided with a third riveting hole; and a third riveting column is arranged at a position, corresponding to the third riveting hole, on the fixed seat.

10. The protective case according to claim 1, wherein a shaft turntable is arranged at a lower end of the fixed seat; a diameter of the shaft turntable is precisely matched with an inner ring of the rotating member axially; and an anti-falling edge is also arranged at an upper end of the rotating slot.

* * * * *